United States Patent Office 3,657,227
Patented Apr. 18, 1972

3,657,227
PROCESS FOR PRODUCING PREGNANES
Richard Wightman Kierstead and Perry Rosen, North Caldwell, N.J., assignors to Hoffmann-La Roche Inc., Nutley, N.J.
No Drawing. Filed Dec. 11, 1969, Ser. No. 884,324
Int. Cl. C07c 173/00
U.S. Cl. 260—239.55
21 Claims

ABSTRACT OF THE DISCLOSURE

A process for producing 4,6-dihalo-16-alkylidene pregna-4,6-diene-3,20-diones useful as progestational agents from a 16α,17α-epoxy-3-alkanoyloxy-16-alkyl-pregn-5-en-20-one, and intermediates thereof.

SUMMARY OF THE INVENTION

In accordance with this invention, a process is provided for producing progestational agents of the formula:

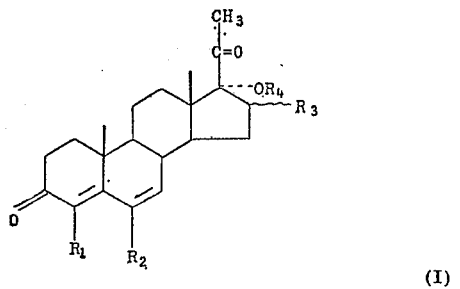

(I)

wherein $R_1$ and $R_2$ are chlorine or bromine;
$R_3$ is lower alkylidene; and $R_4$ is hydrogen or lower alkanoyl,
from a compound of the formula:

(II)

wherein $R_5$ is a lower alkanoyl; and $R_6$ is lower alkyl,
via an intermediate of the formula:

(III)

wherein $R_2$ is as above; X is a halogen, and $n$ is an integer from 0 to 5.

The compounds of Formula I above are highly valuable as progestational agents have been prepared via dehydrogenation procedures that, in some cases, have proven expensive. By the series of selective reactions on the steroid nucleus involved in the process of this invention, the compound of Formula I above is produced in high yields without utilizing costly dehydrogenation procedures and costly separation procedures that causes loss of yield.

DETAILED DESCRIPTION OF THE INVENTION

As used herein, the term "halogen" comprehends all four halogens, such as chlorine, fluorine, bromine and iodine, with chlorine being the preferred halogen. The term "lower alkyl," as used herein, comprehends both straight and branched chain saturated hydrocarbon moieties having from one to six carbon atoms such as methyl, ethyl, t-butyl, n-pentyl or the like. The term "halo lower alkyl" includes mono and di-substituted halo lower alkyl moieties such as chloromethyl, 2-chloroethyl, 3-bromopropyl, 1,2-dichloroethyl with chloromethyl being preferred. The preferred halo lower alkyl moieties are those halo lower alkyl moieties wherein the halo group is attached to the same carbon atom which is attached to the steroid nucleus. The term "lower alkylidene" indicates a straight or branched chain hydrocarbon moiety having from one to six carbon atoms, the terminal carbon atom of which has two free valence bonds such as methylene, ethylidene, isopropylidene and the like, with methylene being preferred. The term "lower alkanoyl" comprehends residues of lower alkane carboxylic acids such as acetyl, butyryl, caprylyl or the like, containing from one to six carbon atoms. The term "alkali metal" includes alkali metals such as sodium, potassium and lithium.

The compounds of Formula I above are characterized by their high degree of progestational activity. Thus, the compounds of Formula I above can be administered enterally for example, orally or parenterally, with dosage adjusted to individual requirements, in the form of conventional pharmaceutical preparations. For example, the compounds of Formula I can be administered in conventional pharmaceutical solid or liquid forms, such as tablets, pills, capsules, solutions, suspensions, emulsions, or the like. These pharmaceutical preparations can contain conventional pharmaceutical carriers and excipients, such as water, talc, corn starch, polyalkylene glycols, emulsifying agents, buffering agents, agents for the adjustment of osmotic pressure, Vaseline, and the like. Though it is preferred to administer the endocrinologically useful compounds of this invention enterally, the compounds of Formula I above can also be administered topically. For this purpose, i.e., topical administration, these compounds can be administered in conventional topical administration forms, such as ointments or creams, in combination with conventional topical carriers such as petrolatum, stearic acid or the like. Also compositions containing the active ingredient of this invention can be subjected to conventional pharmaceutical processes such as sterilization or the like. Also, the pharmaceutical compositions of this invention can contain other active ingredients. Moreover, the endocrinologically active compounds can be administered as feed additives, and for this purpose can be admixed with conventional animal feeds or conventional animal premixes. Though as indicated dosages of the endocrinologically useful compounds of this invention should be adjusted to individual needs, the compound of Formula I above can be administered internally in daily dosage regimens of from about 0.005 mg./kg. to about 0.15 mg./kg. per day. The dosages can be administered in unit or divided dosage forms.

The usefulness of the compounds of this invention as progestational agents is indicated in animals, for example, the compound of this invention, when administered to estrogen primed immature female rabbits for five days shows the presence of progestational activity by a secretory type endometrial response observed on histological sections prepared from the rabbits' uteri and examined microscopically. A maximal response is demonstrated by progesterone at 200 mg./kg. for five days, where as a compound of Formula I such as 4,6-dichloro-17α-acetoxy-16-methylenepregna-4,6-diene-3,20-dione which when administered to rabbits showed progestational activity at 10 mcg./kg./day for s.c.

In accordance with the process of this invention, the compound of Formula III above is prepared from the compound of Formula II above via the following reaction scheme:

pound of Formula VI, via reaction step (c), by refluxing the compound of Formula V in the presence of a strong acid. Any conventional strong acid can be utilized in carrying out the reaction of step (c). Among the strong acids which can be utilized in accordance with this invention are included, p-toluene sulfonic acid, hydrohalic acids such as hydrogen bromide, hydrochloric acid, etc. This reaction can take place by utilizing the strong acid as the solvent medium. On the other hand, an inert organic solvent such as benzene can be utilized in addition to the

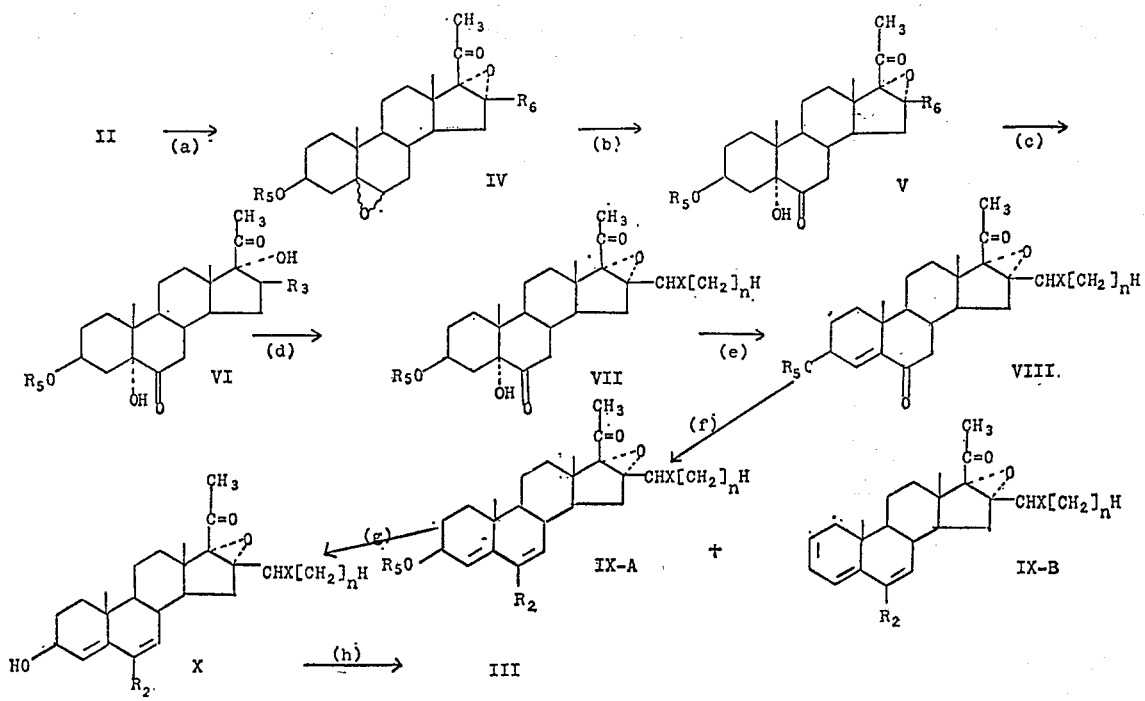

wherein $R_2$, $R_3$, $R_5$, $R_6$, X, and $n$ are as above.

The compound of Formula II is converted to the compound of Formula IV, via reaction step (a), by treating the compound of the Formula II with a peracid. Any conventional organic peracid can be utilized in effecting this conversion. Among the organic peracids which can be utilized are included, peracetic acid, perbenzoic acid, m-chloroperbenzoic acid, etc. with m-chloroperbenzoic acid being the preferred acid. Generally, this reaction is carried out in the presence of an inert organic solvent. Any conventional inert organic solvent can be utilized in this reaction. Among the organic solvents which can be utilized in this reaction are included, the ether solvents such as diethyl ether, tetrahydrofuran, and the chlorinated hydrocarbon solvents such as carbontetrachloride, chloroform, etc. The preferred organic solvents are the chlorinated hydrocarbons. The reaction of step (a) can be carried out at any temperature of from about —10° C. to 15° C. Generally, it is preferred to carry out this reaction at a temperature of from —5° C. to 5° C.

The compound of Formula IV above is converted to the compound of Formula V by treating the compound of Formula IV with chromium trioxide. The chromium trioxide oxidizing agent can be prepared as an aqueous solution. Generally, this reaction can be carried out in the presence of an inert organic solvent. Any conventional inert organic solvent such as the ether solvents hereinfore mentioned, and the ketone solvents such as diethyl ketone, dimethyl ketone, and methylethyl ketone can be utilized in carrying out the reaction of step (b). The reaction of step (b) can be carried out at any temperature of from 20–40° C. Generally, it is preferred to carry out this reaction at a temperature of from about 25° C. to about 30° C.

The compound of Formula V is converted to the comstrong acid. Among the preferred organic solvents are included benzene, toluene, etc. In carrying out the reaction of step (c), room temperature and atmospheric pressure can be utilized. If desired, higher or lower temperatures can also be utilized. Generally, it is preferred to carry out this reaction at the reflux temperature of the reaction medium where p-toluene sulfonic acid and benzene are utilized.

The compound of Formula VI is converted to the compound of Formula VII via reaction step (d), by treating the compound of the Formula VI with a halogen, preferably chlorine. This reaction is carried out in the presence of a proton acceptor. Any conventional proton acceptors such as, for example, nitrogen-containing heterocyclic bases, e.g., pyridine, picoline, or the like; or tri-lower alkyl amines, e.g., triethyl amine, etc. The preferred proton acceptor is pyridine. Generally, this reaction is carried out in an inert organic reaction medium. Any conventional inert organic solvent can be utilized in carrying out this reaction. Generally, solvents such as hydrocarbon solvents, for example, benzene, toluene, etc.; ethers, for example, ethyl ether or dioxane; chlorinated hydrocarbons, for example, chloroform, carbontetrachloride, ethylene chloride, or methylene chloride; or the like, are utilized. Generally, in carrying out this reaction it is preferred to utilize hydrocarbons such as benzene as the solvent medium. The halogen can be introduced into the reaction medium by conventional techniques, e.g., a solution containing the halogen can be introduced into the reaction medium. This reaction is preferably carried out at low temperatures, i.e., preferably between —40° C. and 35° C., more advantageously between —30° C. and 0° C.

The compound of Formula VII is converted, in reaction step (e), to the compound of Formula VIII by treating the compound of Formula VII with a dehydrating agent. Any conventional dehydrating agent can be utilized in carrying out this reaction. Among the preferred dehydrating agents are included, thionyl chloride, phosphoryl chloride, and methyl chlorosulfite. This reaction is carried out in the presence of a proton acceptor. Any of the conventional proton acceptors hereinbefore mentioned can be utilized. Among the preferred proton acceptors are included pyridine and collidine. The reaction of step (e) is carried out at low temperatures. Generally, temperatures of from about −50° C. to about 30° C. can be utilized. In carrying out this reaction, it is preferred to utilize a temperature of from about −10° C. to 10° C.

A compound of Formula VIII is converted to the compound of Formula IX-A, via reaction step (f), by treating the compound of the Formula VIII with a phosphorous chloride or a phosphorous bromide. In this reaction, the compound of the Formula IX-B can be formed as an impurity. This impurity can be removed by conventional means such as column chromatography. This reaction is carried out in the presence of an inert organic solvent. Any conventional inert organic solvent can be utilized in this reaction. Among the conventional inert organic solvents are included, hydrocarbon solvents such as benzene and toluene; halogenated hydrocarbon solvents such as methylene chloride, chloroform, etc. The halogenating agent can be any phosphorous bromide or phosphorous chloride, such as phosphorous pentabromide and phosphorous pentachloride. If desired, nitrogen gas can be bubbled into the reaction medium during the reaction to prevent loss of yield. In carrying out this reaction, temperatures of from about 0° C. to 50° C. can be utilized. Generally, it is preferred to carry out this reaction at a temperature of from about 10° C. to 35° C. It has been found that if this reaction is carried out in the presence of an inorganic base, the presence of the compound of the Formula IX-B in the reaction mixture is eliminated. Therefore, it is generally preferred to carry out this reaction in the presence of an inorganic base so as to prevent the formation of the compound IX-B and loss of yield of the compound of Formula IX-A. Any conventional inorganic base can be utilized. Generally, it is preferred to utilize the alkali metal carbonates and alkali metal bicarbonates as the inorganic base. The preferred inorganic base is sodium bicarbonate. Hence, by this reaction scheme, it is possible to provide a direct synthetic means for producing the compound of Formula I without formation of a by-product such as compound IX-B. This method eliminates any necessity of separating various by-products with a consequential loss of yield.

The compound of Formula IX-A can be converted to the compound of Formula X, via reaction step (g) by treatment with a basic hydrolyzing agent. Any conventional basic hydrolyzing agent which includes the strong inorganic bases such as the alkali metal hydroxide can be utilized in carrying out this reaction. Any of the conditions conventional in basic hydrolysis can be utilized in this conversion.

The conversion of a compound of the Formula X to a compound of the Formula III, via reaction step (h), is carried out by treating the compound of the Formula X with an oxidizing agent. The oxidizing agents utilized in this reaction are: chromium trioxide in an organic solvent such as glacial acetic acid or acetone; manganese dioxide; the Jones reagent (chromium trioxide in sulfuric acid and acetone solvent); the Oppenauer reagent (aluminum isopropoxide in ketone solvents such as acetone and cyclohexanone); or dichlorodicyanobenzoquinone. Any of the conditions conventional in utilizing these oxidizing agents can be utilized in carrying out the reaction of step (h).

The intermediate III is converted to the compound of the Formula I by the following reaction scheme:

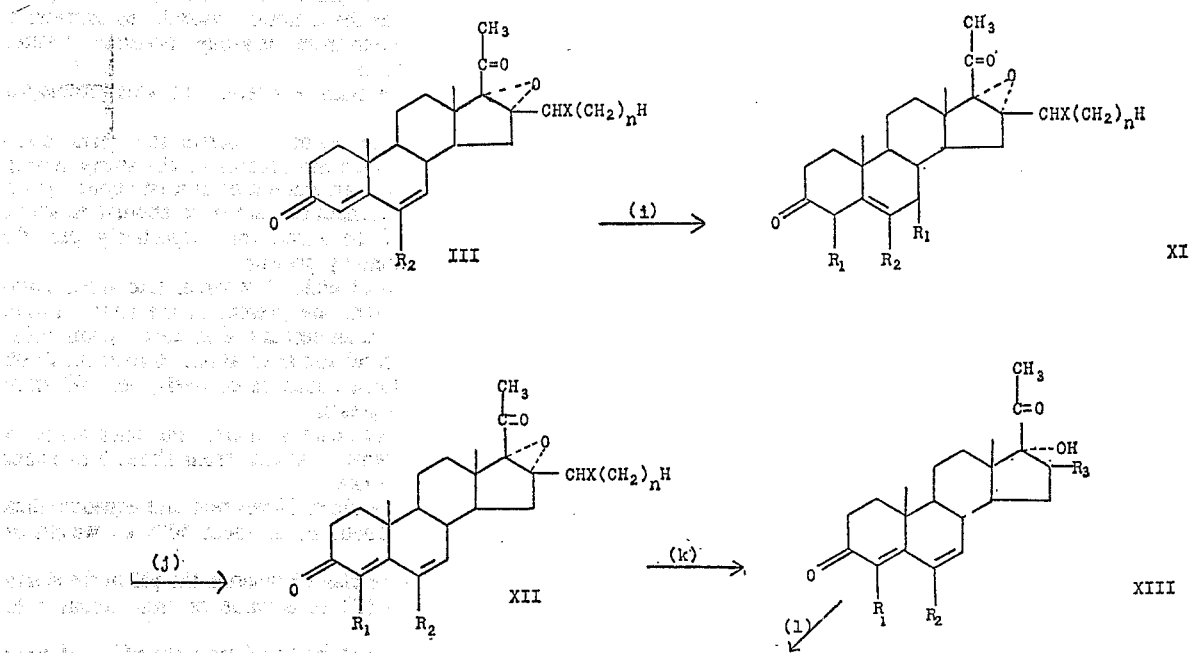

wherein $R_1$, $R_2$, $R_3$, X and $n$ are as above.

The compound of Formula III is converted to the compound of Formula XI, via reaction step (i), by treating the compound of the Formula III with a halogen selected from the group consisting of chlorine or bromine. This step may be facilitated by the addition of a catalytic amount of an anhydrous mineral or organic acid. Among the preferred acids are the hydrohalic acids, e.g., hydrogen chloride. This reaction is generally carried out in an inert organic reaction medium, for example, ethers such as the lower alkyl ethers which include ethyl ether or dioxane; halogenated hydrocarbons such as chloroform, carbontetrachloride, methylene chloride or ethylene chloride or the like. The preferred solvents for utilization in this reaction are the halogenated hydrocarbons. The halogen can be introduced into the reaction medium by conventional means, e.g., a solution containing the halogen can be introduced into the reaction mixture. A halogen dissolved in a halogenated hydrocarbon, for example, chlorine in carbontetrachloride is suitable for this purpose. This halogenation reaction is suitably effected at low temperatures, preferably between −40° C. and room temperature, or advantageously between −30° and 0° C.

The compound of Formula XI can be converted to the compound of Formula XII, via reaction step (j), by treating the compound of Formula XI with a dehydrohalogenating agent. The dehydrohalogenating agents which are utilized in this reaction are preferably proton acceptors, such as for example, nitrogen containing heterocyclic bases, e.g., pyridine, picoline or the like; or trilower alkyl amines, e.g., triethyl amine; and alkali metal inorganic bases such as sodium hydroxide or sodium bicarbonate. A suitable solvent for use in this reaction is the base itself. However, other solvents such as inert organic solvents, for example, ethers such as lower alkyl ethers, which include diethyl ether or dioxane; chlorinated hydrocarbons such as chloroform or carbontetrachloride may also be employed. This reaction is generally carried out at temperatures of from about 0° C. to 100° C., although a temperature range of 0–50° C. is preferred. The preferred base for use in this reaction is a nitrogen containing heterocyclic base with pyridine being especially preferred.

The compound of Formula XII is converted to the compound of Formula XIII, via reaction step (i) by refluxing the compound of Formula XII with an alkali metal iodide, preferably sodium iodide followed by the addition of lower alkanoic acid. Alternatively, the compound of Formula XII can be converted to the compound of Formula XIII by refluxing the compound of Formula XII with an alkali metal iodide in the presence of a lower alkanoic acid, preferably acetic acid. This reaction is generally carried out in the presence of an inert organic solvent. Among the preferred solvents are the ketone solvents such as acetone, methyl ethyl ketone, etc.

The compound of Formula XIII is converted to the compound of the Formula I, by treating the compound of the Formula XIII with a lower alkanoic acid anhydride. Any of the conditions conventional in alkanoylating reactions can be utilized in carrying out this reaction. The alkanoylating reaction is carried out generally in the presence of an acid catalyst. Among the conventional acid catalysts which can be utilized in the reaction of step (h) are included the strong acids such as p-toluene sulfonic acid, sulfuric acid, etc. In carrying out this reaction, temperature and pressure are not critical and this reaction can be carried out at room temperature. However, if desired, higher or lower temperatures can be utilized.

The following examples are illustrative of this invention but not limitative thereof. All temperatures in the examples are stated in degrees centigrade.

EXAMPLE 1

Preparation of 5ξ, 6ξ, 16α, 17α-diepoxy-2β-hydroxy-16β-methylpregnan-20-one acetate To a cooled solution (0°) of 75 g. (0.194 mole) of 16α, 17α-epoxy-3β-hydroxy-16β-methylpregn-5-en-20-one acetate in 750 ml. of chloroform was added 59.4 g. of m-chloroperbenzoic acid (85% activity). The mixture was stirred at 0- for 30 minutes after which time the precipitated m-chlorobenzoic acid was filtered and washed with a small amount of chloroform. The combined chloroform solution was washed with 10% sodium thiosulfate, 0.1 N sodium hydroxide (until strongly basic), and finally saturated sodium chloride solution. The chloroform solution was dried (MgSO₄) and the solvent was removed under reduced pressure. The residue was then triturated with diethyl ether to give 5ξ,6ξ,16,17α-diepoxy-3β-hydroxy-16β-methylpregnan-20-one acetate.

EXAMPLE 2

Preparation of 3β,5α-dihydroxy-16β-methyl-16α,27α-epoxypregnane-6,20-dione 3-acetate To a suspension of 67 g. (0.17 mole) of 5ξ,6ξ,16α,17α-diepoxy-3β-hydroxy-16β-methylpregnan-20-one acetate in 400 ml. of methyl ethyl ketone was added dropwise 75 ml. of an aqueous chromium trioxide solution. The temperature was maintained between 20–25° during the addition. After stirring for 30 minutes at this temperature another 35 ml. of the chromium trioxide solution was added dropwise and the dark reaction mixture allowed to stir for another 45 minutes. The mixture was then added to 3 liters of ice water and the tan precipitate filtered and washed thoroughly with water. The residue was dried overnight under house vacuum. Crystallization from methanol gave 3β, 5α - dihydroxy-16β-methyl-16α,17α-epoxypregnane-6,20-dione 3-acetate.

EXAMPLE 3

Prepaartion of 3β,5α,17α-trihydroxy-16-methylenepregnane-6,20-dione 3-acetate

A mixture of 28 g. of 3β,5α-dihydroxy-16β-methyl-16α,-17α-epoxypregnane-6,20-dione 3-acetate, 0.48 g. of para-toluenesulfonic acid and 300 ml. of dry benzene was stirred and refluxed for 2 hours. At the end of this time the mixture was cooled (0°) and the precipitate was filtered and washed with a small amount of ether to give 3β,5α,17α-trihydroxy-16-methylenepregnane-6,20-dione 3-acetate.

EXAMPLE 4

Preparation of 16β-chloromethyl-3β,5α-dihydroxy-16α,-17α-epoxypregnane-6,20-dione 3-acetate To a stirred suspension of 27 g. (0.0647 mole) of 3β,5α, 17α-trihydroxy - 16 - methylenepregnane - 6,20 - dione 3-acetate (M.P. 245–250°) in 540 ml. of dry benzene was added at 0°, 5.75 ml. of pyridine followed by the dropwise addition of 77.4 ml. of a 0.92 molar solution of chlorine in carbon tetrachloride. At the end of the addition, the reaction mixture was allowed to warm to 10° and stirred at this temperature for 30 minutes. The white precipitate was filtered and washed with benzene. The benzene solutions were combined and washed with 5% sodium thiosulfate solution, 0.1 N hydrochloric acid solution, saturated sodium chloride solution, and then dried over magnesium sulfate. The solvent was then removed under vacuum and the residue triturated with diethyl ether to give 16β-chloromethyl-3β,5α-dihydroxy - 16α,17α-epoxypregnane-6,20-dione 3-acetate.

EXAMPLE 5

Preparation of 16β-chloromethyl-3β-hydroxy-16α,17α-epoxypregn-4-ene-6,20-dione acetate To a stirred solution of 28.5 g. (0.063 mole) of 16β-chloromethyl-3β,5α-dihydroxy - 16α,17α-epoxypregnane-6,20-dione 3-acetate (M.P. 205–210°) in 285 ml. of dry pyridine at 0° was added dropwise 17.1 ml. of thionyl chloride. After the addition was completed the reaction mixture was stirred for an additional 2 hours at 0°. The reaction mixture was then poured into 2 liters of ice water and stirred for 15 minutes. The precipitates was filtered, washed with water and air dried for 2 hours under house vacuum. The product was then dissolved in benzene; the solution dried (MgSO₄), heated with charcoal, filtered and the solvent removed under reduced pressure. Trituration of the residue with diethyl ether gave 16β-chloromethyl-3β-hydroxy - 16α,17α - epoxypregn - 4 - ene-6,20-dione acetate.

EXAMPLE 6

Preparation of 6-chloro-16β-chloromethyl-3β-hydroxy-16α,17α-epoxypregna-4,6-dien-20-one acetate To a stirred suspension of 50 g. of sodium bicarbonate in 500 ml. of benzene was added 10 g. (0.023 mole) of 16β-chloromethyl - 3β - hydroxy - 16α,17α - epoxypregn-4-ene-6,20-dione acetate. With nitrogen bubbling through the mixture, 30 g. of phosphorous pentachloride was added, and the mixture was stirred at room temperature for 30 minutes. The reaction mixture was then cooled to 0° and slowly added to two liters of an ice cooled aqueous solution containing 3% by weight of sodium bicarbonate. After stirring for 30 minutes the benzene layer was separated, washed with water, saturated sodium chloride solution and then dried (MgSO₄). The solvent was removed under reduced pressure and the residue triturated with methanol to give 6-chloro - 16β - chloromethyl-3β-hydroxy-16α,17α-epoxypregna-4,6-dien-20-one acetate.

EXAMPLE 7

Preparation of 6-chloro-16β-chloromethyl-3β-hydroxy-16α,17α-epoxypregna-4,6-dien-20-one To 40 ml. of a 0.243 molar solution of sodium hydroxide in ethanol was added 4 g. (0.0083 mole) of 6-chloro-16β-chloromethyl-3β-hydroxy - 16α,17α - epoxypregna-4,6-dien-20-one acetate (M.P. 135–150°). Solution slowly occurred and after stirring for one hour, 20 ml. of ethanol and a small amount of charcoal was added to the cloudy brownish solution. The mixture was filtered and the solvent removed under reduced pressure. Water (200 ml.) was then added to the residue and the mixture extracted with diethyl ether. The ether solution was dried (MgSO₄) and the solvent removed under reduced pressure to give 6-chloro - 16β - chloromethyl - 3β - hydroxy-16α,17α-epoxypregna-4,6-dien-20-one as a white foam.

EXAMPLE 8

Preparation of 16β-chloromethyl-4,6-dichloro-16α,17α-epoxypregna-4,6-diene-3,20-dione To a solution of 3.5 g. of 6-chloro-16β-chloromethyl-3β-hydroxy-16α,17α-epoxypregna - 4,6 - dien-20-one in 35 ml. of alcohol-free acetone was added dropwise at 0° 3.5 ml. of Jones reagent. After 5 minutes one ml. of isopropyl alcohol was added and the solvent removed under reduced pressure. Water (100 ml.) was added to the residue and the mixture extracted with diethyl ether. The ether solution was washed with an aqueous solution containing 5% by weight of sodium bicarbonate, a saturated aqueous sodium chloride solution and dried (MgSO₄). The solvent was then removed under reduced pressure to give crude 16β-chloromethyl - 6 - chloro - 16α,17α - epoxypregna-4,6-diene-3,20-dione. The crude product was dissolved in a minimum of benzene and passed through 30 g. of silica gel. The column was eluted with 500 ml. of 2% ethylacetate-benzene to give 16β-chloromethyl-6-chloro-16α,17α-epoxypregna-4,6-diene-3,20-dione.

To a cooled (0°) solution of 2.3 g. of 16β-chloromethyl-6-chloro-16α,17α-epoxypregna-4,6-diene-3,20-dione in 20 ml. of chloroform was added 7.3 ml. of a 0.85 molar solution of chlorine in carbon tetrachloride. The reaction mixture was stirred at 0° for 45 minutes and the solvent was then removed under reduced pressure. The residue was treated with 10 ml. of pyridine and stirred at room temperature for 2 hours. The pale yellow mixture was poured into 150 ml. of diethyl ether and the ether solution extracted several times with dilute sulfuric acid to remove all of the pyridine. The ether solution was then washed with a saturated aqueous sodium chloride solution, dried (MgSO₄), and the ether removed under reduced pressure. The residue was triturated with diethyl ether to give 16β-chloromethyl - 4,6 - dichloro - 16α,17α-epoxypregna-4,6-diene-3,20-dione.

EXAMPLE 9

Preparation of 4,6-dichloro-17α-hydroxy-16-methylenepregna-4,6-diene-3,20-dione acetate To a stirred suspension of 3 g. of sodium iodide in 20 ml. of acetone was added 300 mg. of 16β-chloromethyl-4,6 - dichloro - 16α,17α-epoxypregna-4,6-diene-3,20-dione and the mixture was refluxed for 24 hours. At the end of this time 0.5 ml. of glacial acetic acid was added and refluxing was continued for an additional 2 hours. To the cooled dark solution was added 15 ml. of 0.1 N sodium thiosulfate solution and the acetone was then removed under reduced pressure. Water was added to the residue and the precipitate was filtered and washed thoroughly with water. The product was dried for 2 hours under vacuum and was then dissolved in a minimum amount of ether. The yellow ether solution was washed with 0.1 N sodium thiosulfate solution, dried (MgSO₄) and evaporated to give 4,6-dichloro-17α-hydroxy-16-methylenepregna-4,6-diene-3,20-dione which was used directly for the next step.

A mixture of 200 mg. of crude 4,6-dichloro-17α-hydroxy-16-methylenepregna-4,6-diene-3,20-dione, 1 ml. of acetic anhydride and 25 mg. of p-toluene sulfonic acid mono-hydrate was allowed to stir at room temperature for 3 hours. Water (50 ml.) was then added and the mixture was stirred for 1 hour. The precipitate was filtered, washed with water, and dried for 2 hours under hose vacuum. The product was then dissolved in a minimum of methylene chloride and dried (MgSO₄). The solvent was removed under reduced pressure and the residue was crystalized from methanol to give 4,6-dichloro-17α-acetoxy-16-methylenepregna-4,6-diene-3,20-dione.

We claim:
1. A pregnane of the formula:

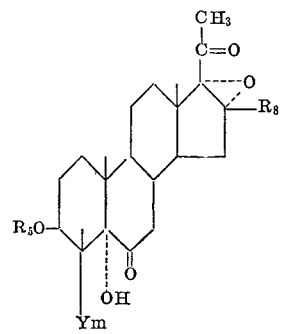

wherein $R_5$ is lower alkanoyl; $R_8$ is lower alkyl and —CHX(CH₂)ₙH; Y is an unsaturation between the 4 and 5-positions; X is a halogen; $m$ is an integer from 0 to 1; and $n$ is an integer from 0 to 5, with the proviso that when $m$ is 1, the pregnane is unsubstituted at the 5-position.

2. The pregnane of claim 1 wherein said pregnane is 3β,5α - dihydroxy - 16β - methyl-16α,17α-epoxypregnane-6,20-dione 3-acetate.

3. The pregnane of claim 1 wherein said pregnane is 16β - chloromethyl - 3β,5α - dihydroxy - 16α,17α-epoxypregnan-6,20-dione 3-acetate.

4. The pregnane of claim 1 wherein said pregnane is 16β - chloromethyl - 3β - hydroxy - 16α,17α-epoxypregn-4-ene-6,20-dione acetate.

5. A pregnane of the formula:

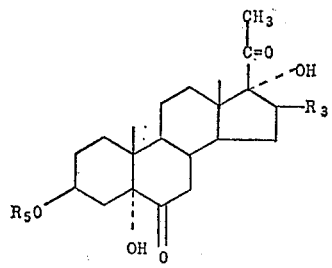

wherein $R_3$ is lower alkylidene and $R_5$ is lower alkanoyl.
6. The pregnane of claim 5 wherein said pregnane is 3β,5α,17α - trihydroxy-16-methylenepregnan-6,20-dione 3-acetate.

7. A pregnane of the formula:

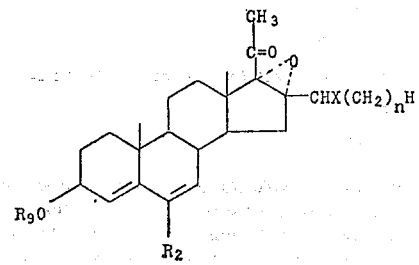

wherein $R_9$ is hydrogen or lower alkanoyl; $R_2$ is chlorine or bromine; X is a halogen; and n is an integer from 0 to 5.

8. The pregnane of claim 7 wherein said pregnane is 6-chloro-16β-chloromethyl-3β-hydroxy - 16α,17α - epoxy-pregna-4,6-dien-20-one-acetate.

9. The pregnane of claim 7 wherein said pregnane is 6-chloro - 16β - chloromethyl-3β-hydroxy-16α,17α-epoxy-pregna-4,6-diene-20-one.

10. A process of producing a halo compound of the formula:

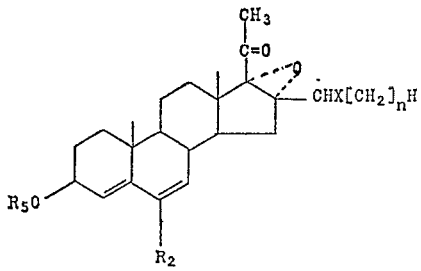

wherein $R_2$ is chlorine or bromine; X is a halogen; $R_5$ is lower alkanoyl; and n is an integer from 0 to 5;

comprising treating a diketo compound of the formula:

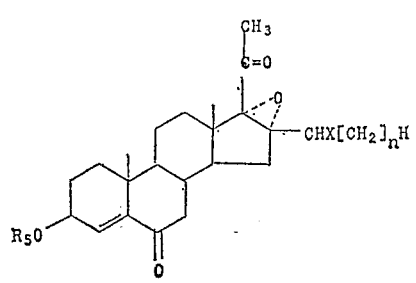

wherein $R_5$, X and n are as above;

with a phosphorous chloride or phosphorous bromide in an inert organic solvent medium at a temperature of from 0° C. to 50° C.

11. The process of claim 10 wherein said diketo compound is treated with phosphorous pentachloride.

12. The process of claim 11 wherein an inorganic base is present in the reaction medium.

13. The process of claim 12 wherein said inorganic base is selected from the group consisting of alkali metal carbonates and alkali metal bicarbonates.

14. The process of producing a compound of the formula:

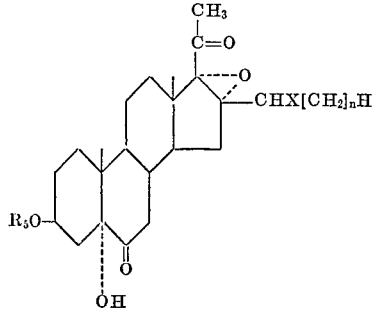

wherein $R_5$ is lower alkanoyl; X is a halogen; and n is an integer from 0 to 5;

comprising treating a dihydroxy compound of the formula:

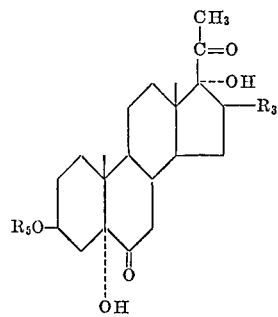

wherein $R_5$ is as above; and $R_3$ is lower alkylidene;

with a halogen in the presence of a proton acceptor.

15. The process of claim 14 wherein said proton acceptor is pyridine and said halogen is chlorine.

16. A process of producing a compound of the formula:

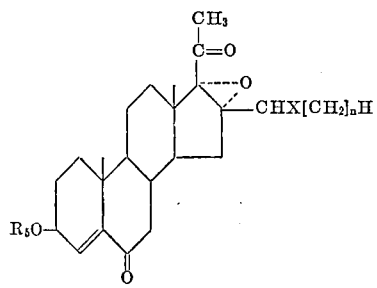

wherein $R_5$ is lower alkanoyl; X is a halogen; and n is an integer from 0 to 5;

comprising treating a compound of the formula:

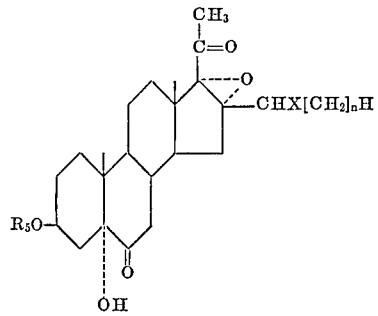

wherein $R_5$, X and n are as above;

with a dehydrating agent in the presence of a proton acceptor.

17. The process of claim 16 wherein said dehydrating agent is thionyl chloride.

18. The process of claim 17 wherein said proton acceptor is pyridine.

19. A process for producing a compound of the formula:

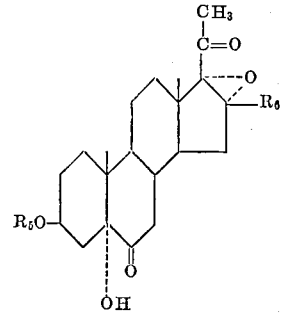

wherein $R_5$ is lower alkanoyl; and $R_6$ is lower alkyl; comprising treating the compound of formula:

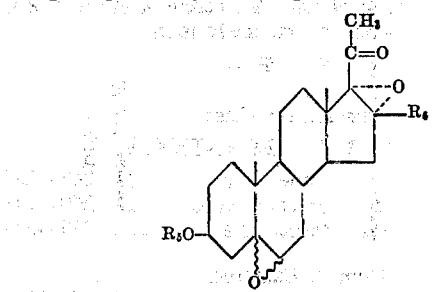

wherein $R_5$ and $R_6$ are as above;
with chromium trioxide at a temperature of from 20° C. to 40° C.

20. A process for producing a compound of the formula:

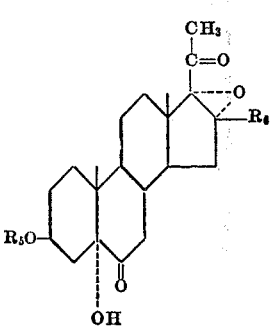

wherein $R_5$ is lower alkanoyl; and $R_6$ is lower alkyl; comprising treating a compound of the formula:

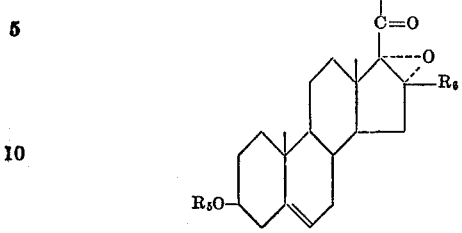

wherein $R_5$ and $R_6$ are as above;
with an organic per-acid at a temperature of from about —10° C. to 50° C.

21. The process of claim 20 wherein said organic per-acid is m-chloroperbenzoic acid.

References Cited

UNITED STATES PATENTS 3,527,778   9/1970   Baran et al. _____ 260—397.45

OTHER REFERENCES

"Steroid Reactions," by Djerassi (1963), Holden-Day Inc., pp. 101, 111 relied on.

ELBERT ROBERTS, Primary Examiner

U.S. Cl. X.R.
260—397.4